United States Patent
Kilcher et al.

(10) Patent No.: US 9,417,450 B2
(45) Date of Patent: Aug. 16, 2016

(54) PROJECTION APPARATUS USING TELECENTRIC OPTICS

(75) Inventors: Lucio Kilcher, Montreux (CH); Nicolas Abele, Demoret (CH)

(73) Assignee: INTEL CORPORATION, Santa Clara, CA (US)

( * ) Notice: Subject to any disclaimer, the term of this patent is extended or adjusted under 35 U.S.C. 154(b) by 203 days.

(21) Appl. No.: 14/356,754

(22) PCT Filed: Aug. 15, 2012

(86) PCT No.: PCT/EP2012/065963
§ 371 (c)(1),
(2), (4) Date: May 7, 2014

(87) PCT Pub. No.: WO2103/068137
PCT Pub. Date: May 16, 2013

(65) Prior Publication Data
US 2014/0285899 A1    Sep. 25, 2014

Related U.S. Application Data

(60) Provisional application No. 61/557,710, filed on Nov. 9, 2011.

(51) Int. Cl.
G02B 27/01     (2006.01)
G02B 13/22     (2006.01)
G02B 27/48     (2006.01)
G02B 5/02      (2006.01)

(52) U.S. Cl.
CPC ............ G02B 27/0101 (2013.01); G02B 13/22 (2013.01); G02B 27/48 (2013.01); G02B 5/02 (2013.01); G02B 2027/013 (2013.01); G02B 2027/0118 (2013.01)

(58) Field of Classification Search
CPC ............... G02B 27/01; G02B 27/0101; G02B 27/0149; G02B 2027/0154; G02B 27/48; G02B 13/22; G02B 2027/0118; G02B 2027/013; G02B 5/02
See application file for complete search history.

(56) References Cited

U.S. PATENT DOCUMENTS

| 6,185,041 | B1 | 2/2001 | Tadic-Galeb et al. |
| 6,278,553 | B1 | 8/2001 | Akiyama |
| 2009/0244684 | A1* | 10/2009 | Gollier .................. G02B 27/48 359/278 |

* cited by examiner

Primary Examiner — Joseph P Martinez

(57) ABSTRACT

The present invention provides a projection system (10), preferably for a head-up display e.g. on board a vehicle, comprising a laser source (1), a diffuser (3) and telecentric optics (2) disposed between the laser and the diffuser so that the telecentric optics outputs parallel rays to the diffuser, the diffused light being thus independent from the incidence angle; each pixel of the projected image has the same brightness, regardless of the angle or of the position from which it is viewed.

13 Claims, 15 Drawing Sheets

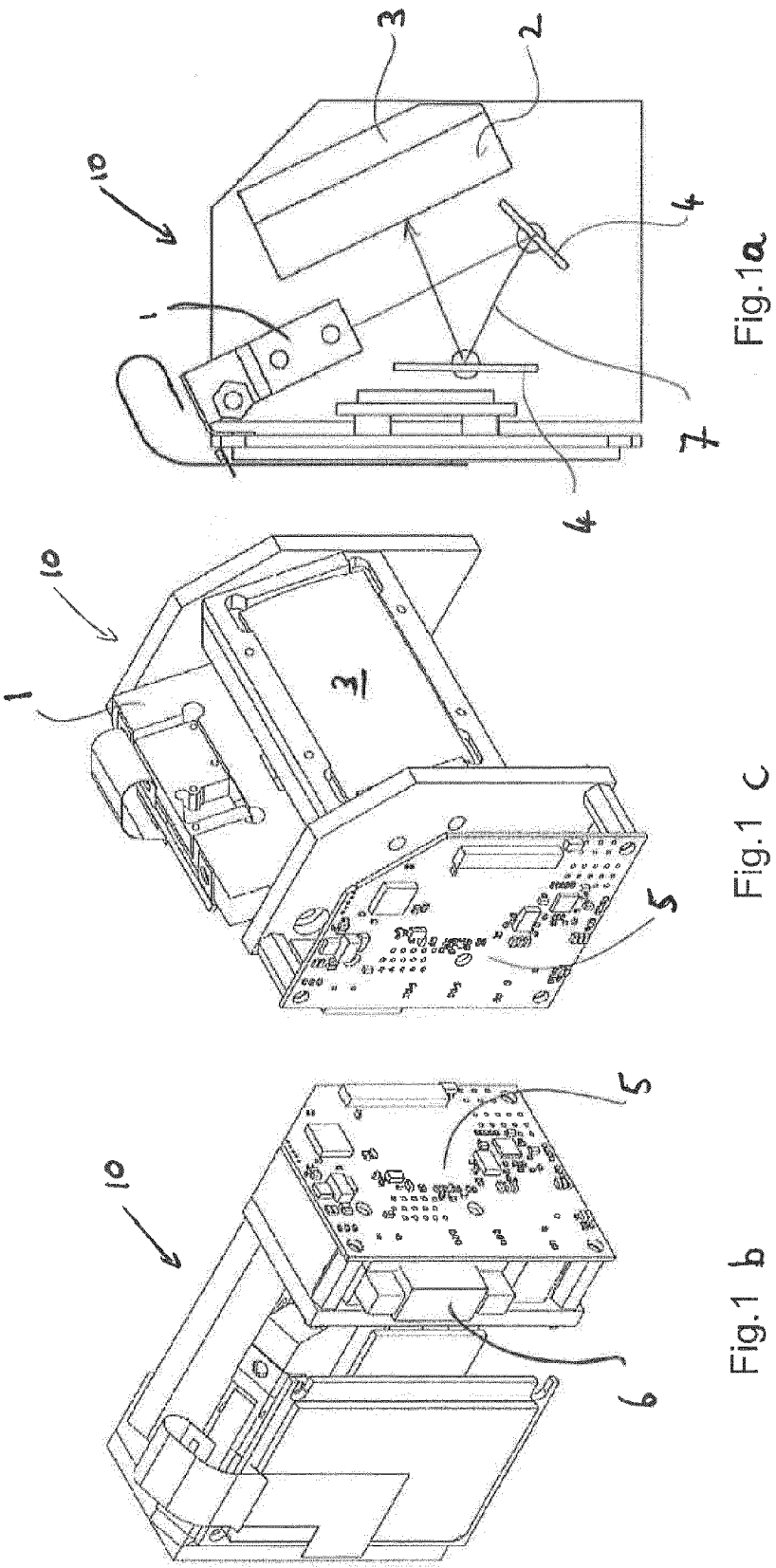

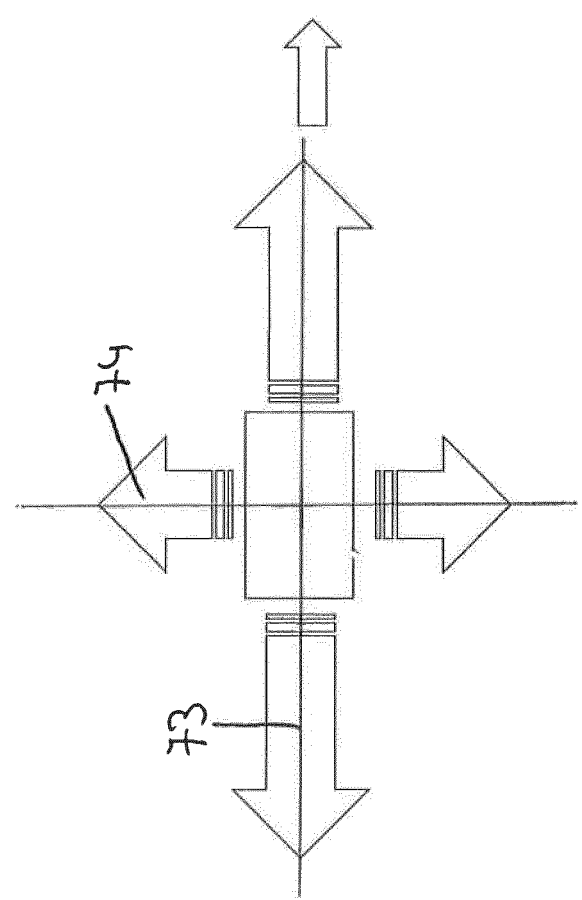

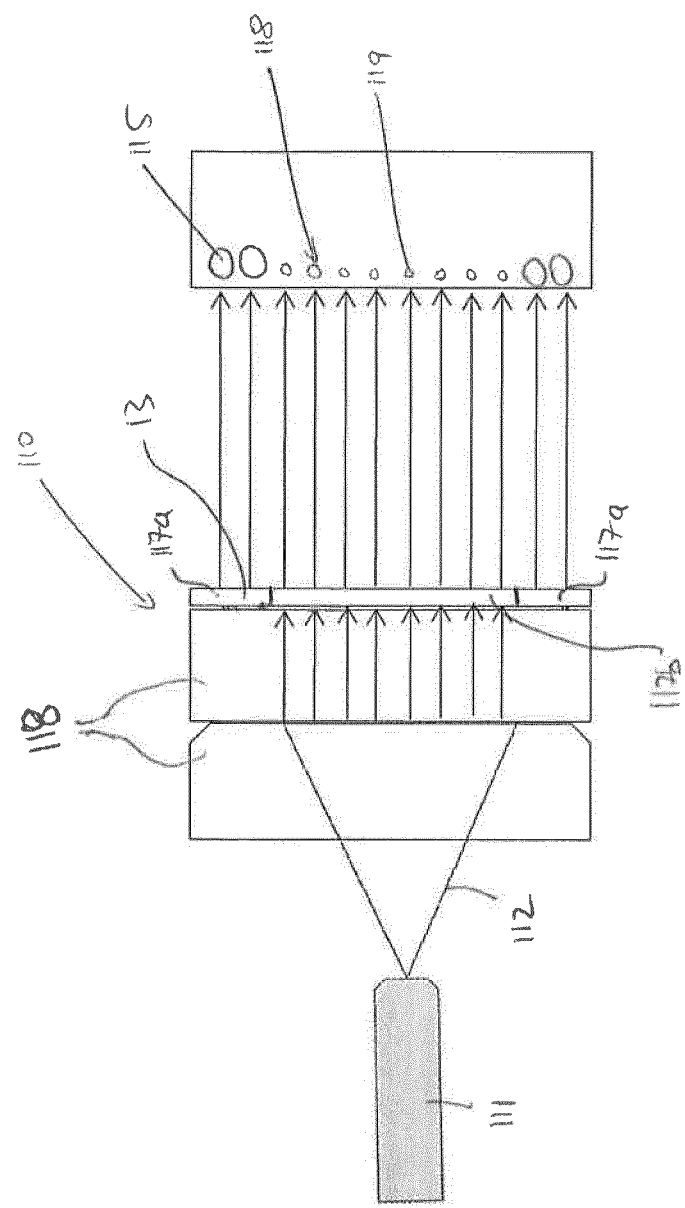

PROJECTION APPARATUS USING TELECENTRIC OPTICS

FIELD OF THE INVENTION

The present invention relates to a projection system and in particularly, but not exclusively, to a projection system which is used in a head-up display system or head-mounted display system.

DESCRIPTION OF RELATED ART

Projection systems have been developed in recent years to project images that present data, images and/or videos, without requiring users to look away from their usual viewpoints. These projection systems are commonly known as head-up display projection systems. Head-up display projection systems typically project images onto a re-emissive or reflective transparent or semi-transparent display or project a virtual image within a predefined view window (i.e. a virtual image is an image which is not projected onto a surface, but which is visible to a user within a predefined view window), so as to enable the user to see the projected images without requiring the user to look away from their usual view points. Head-up display projection systems are common in vehicles such as aeroplanes and cars; they enable for example a driver to view information such as driving speed, without requiring the driver to look away from the road.

Light projected by existing projection systems, including existing head-up display projection systems, is subject to speckle patterning. A speckle pattern is a random intensity pattern produced by the mutual interference of a set of wavefronts. Speckle patterning occurs when the light projected by the projection system onto a display screen is scattered off the display screen. In existing projection systems speckle patterning can also be caused by a diffusion screen within the projection system. Speckle patterning will compromise the quality of the projected image.

Existing projection systems, including existing head-up display projection systems, use diffusers to diffuse light so as to increase the field of view of the projection system In existing projection systems which use diffusers, the diffusers are arranged to receive light rays from a light source; the light rays are diffused and the diffused light rays are projected to a display screen where they display a projected image. The angle at which light is incident on the diffusers will influence the angle at which the light is diffused by the diffuser. In existing projection systems, light rays are incident on diffusers at various different angles; accordingly the corresponding diffuse light rays which are outputted from the diffuser will diffuse at different angles. As the diffused light rays are diffused at different angles, there will be an uneven distribution of light across a display screen and thus the pixels which define the projected image will not have a uniform brightness.

Thin Field Transistor (TFT) projectors ensure that all light rays which are incident on diffusers, are incident perpendicular to a surface of the diffuser. However, the size of the image projected by the TFT projector will determine the required size of the thin field transistor; larger thin field transistors are required to project larger images. Moreover, the size of the diffuser must be scaled to be equal to the size of the thin field transistor. The costs of diffusers increase substantially according to their size. Thus, TFT projectors have disadvantages in terms of size and also in terms of costs.

TFT projectors do not necessarily require diffusers for operation. TFT projectors which do not use diffusers suffer from brightness limitations, low contrasts and low brightness dimming ratio.

It is an aim of the present invention to mitigate, or obviate, as least some of the above-mentioned disadvantages.

BRIEF SUMMARY OF THE INVENTION

According to the present invention, there is provided a projection system comprising, a laser source which is configurable to project light; a light diffusing means which can diffuse light; wherein the laser source and the light diffusing means are arranged to be in optical communication along an optical path; wherein the projection system further comprises a telecentric optical component which is disposed along said optical path between the laser source and the light diffusing means, so that the telecentric optical component receives light projected from the laser source and outputs light comprising parallel rays to the light diffusing means.

As each light ray will be incident on the light diffusing means at the same angle, the angle of diffusion of the diffused light outputted from light diffusing means will be independent of the angle of incidence of the light rays on the light diffusing means. Accordingly, the angle of diffusion of the diffused light outputted from light diffusing means can be accurately controlled by adjusting the properties and position of the light diffusing means appropriately. Ultimately, the light rays outputted from the light diffusing means can be made to be parallel to one another; when the light rays outputted from the light diffusing means are parallel to one another, an even distribution of light across a display screen can be achieved. Thus, each pixel of a projected image will have the same brightness, regardless of the angle or position from which the projected image is viewed.

A telecentric optical component is a component which outputs parallel light rays. Light rays incident on the telecentric optical component can be incident at any angle and the telecentric optical component will output the light rays as parallel light rays. This is possible as a telecentric optical component is a component which has its entrance or exit pupil at infinity; this produces an orthographic view of the subject. This means that the chief rays (oblique rays which pass through the centre of the aperture stop) are parallel to the optical axis in front of or behind the system, respectively.

The telecentric optical component may comprise a single telecentric lens. This will minimise the number of components in the projection system.

The telecentric optical component may comprise a first telecentric lens which is configured to make the light rays on a first axis parallel and a second telecentric lens which is configured to make the light rays on a second axis parallel. For example, the first telecentric lens may be configured to make the light rays on the x-axis parallel and a second telecentric lens may be configured to make the light rays on the y-axis parallel.

The telecentric optical component may comprise an achromatic lens so that no achromatic aberration is generated. Achromatic lenses are lenses which are designed to reduce colour errors. Achromatic lenses are typically made by two lenses which show different refractive index in order to compensate for chromatic errors.

The telecentric optical component may comprise a GRIN (gradient index) lens. A GRIN lens is a lens which has a gradual variation of the refractive index. Such variations can be used to produce lenses with flat surfaces, or lenses that do not have the aberrations typical of traditional spherical lenses.

The GRIN lens may have a refraction gradient that is spherical, axial, or radial. The ability of GRIN lenses to have flat surfaces simplifies the mounting of the lens, which makes them useful where many very small lenses need to be mounted together, such as in photocopiers and scanners. The flat surface also allows a GRIN lens to be easily focused to produce collimated or focused light at its output. The design of such lenses involves detailed calculations of aberrations as well as efficient manufacture of the lenses. A number of different materials can be used for GRIN lenses including optical glasses, plastics, germanium, zinc selenide, and sodium chloride.

The telecentric optical component may further comprise a surface coating which is configured to reduced parasitic reflection. The surface coating may be configured to be at least one of an anti reflection coating, metallic coatings, dielectric coating, and/or dichroic coating. Preferably the telecentric optical component comprises glass or polymer. The polymer is preferably PMMA (Poly(methyl methacrylate). The telecentric optical component may comprise one or more of plastic, resin, high-index plastics (e.g. thiourethanes), polycarbonate, PMMA (Poly(methyl methacrylate)).

The light diffusing means may be integral to the telecentric optical component.

The projection system may further comprise a focusing means arranged to focus light rays before the light rays are received by the light diffusing means. Preferably, the projection system further comprises a focusing means arranged to receive parallel light rays outputted from the telecentric optical component, so that the parallel light rays are focused before the parallel light rays are input to the light diffusing means. The focusing means may be integral to the telecentric optical component.

The light diffusing means may be arranged to diffuse the parallel light rays and output diffused parallel light rays which are used to project an image. The output diffused parallel light rays may be configured to project an image onto a display screen. The light diffusing means may be arranged to project the diffused parallel light rays to a display screen. The display screen may be head-up display screen. The output diffused parallel light rays may be configured to project a virtual image. The output diffused parallel light rays may be configured to project an image on a virtual display screen.

The light diffusing means may comprise a diffusion screen. The light diffusing means may comprise a patterned surface. The surface may comprise a pattern which is configured such that when the light passed through the diffuser, the pattern creates holographic effect that redirects the light with a certain angle and with a certain transmission value. The pattern may be a repetitive pattern. This will ensure that the light is redirected with a certain angle and with a certain transmission value, over the whole of the diffusion screen. The surface may comprise two or more different patterns. The diffusion screen may comprise a transparent or semi-transparent film. The film may define the patterned surface of the light diffusing means. The film is preferably patterned with very specific shapes. The transparent or semi-transparent patterned film may comprise a pattern which is configured such that when the light passes through the diffuser, the pattern creates a holographic effect that redirects the light with a certain angle and with a certain transmission value. The diffuser may comprise a film with a repetitive pattern. Preferably, the light diffusion means is a diffusion screen comprising a surface which comprises two or more different patterns, wherein each of the patterns are configured to redirect light at different angles and/or wherein each of the patterns are configured to provide a different level optical transmission. Techniques to create diffusing patterns on the surface of the diffusion screen, or in a film which can be applied to the diffusion screen, include: hot embossing, with a mould so-called master (for example embossing an epoxy with a nickel master mould and then with or without curing with UV light)

The light diffusing means may comprise a diffusion screen. The light diffusing means may be configured so that all diffused parallel light rays outputted from the light diffusing means are outputted in a direction which is perpendicular to a surface of the light diffusion means. The light diffusing means may comprise a patterned surface so that all diffused parallel light rays outputted from the light diffusing means are outputted in a direction which is perpendicular to a surface of the light diffusion means. The light diffusing means may comprise a repeating pattern on a surface of the light diffusing means. Preferably the light diffusing means comprises a specific pattern wherein the pattern is dependent on the angle of incidence of light which is to be received by the light diffusion means, so that light rays are outputted from the light diffusion means perpendicular to a surface of the light diffusion means. The light diffusing means can be provided with a patterned surface by applying a patterned film to a surface of the diffusion means. The film, or the surface of the light diffusing means, can be provided with a pattern using any suitable means, for example using; hot embossing, with a mould so-called master (for example embossing an epoxy with a nickel master mould and then with or without curing with UV light); using sol-gel technique; or Injection moulding Diffusers used in existing projection systems, receive parallel light rays as an input, these parallel rays are not perpendicular to a surface of the diffuser; as a result the light rays output from the diffuser will have poor brightness uniformity. The diffusers change the direction of the parallel light rays at the output. The telecentric optical component used in the present invention ensures that that the light rays which are input to the light diffusing means are parallel; the telecentric optical component may be further configured to ensure that the light rays are perpendicular to a surface of the light diffusing means at an input of the light diffusing means. Alternatively the projection system may include an additional optical element which ensures that light rays are perpendicular to a surface of the light diffusing means at an input of the light diffusing means. Thus, the light rays input to the light diffusing means are both parallel and also perpendicular to the surface of the light diffusing means. As a result the parallel diffused light rays which are output from the light diffusing means will have improved brightness uniformity (due to uniform light transmission through the diffuser).

The light diffusing means may comprise at least one diffusion screen comprising a plurality of regions wherein each of the plurality of regions is configured to diffuse light at a different angle. The diffusion screen may comprise a patterned surface which enables the diffusion screen to diffuse light at different angles. The patterned surface may be provided by a film which is applied to a surface of the diffusion screen.

The diffusion screen may be configured to have different diffusing properties along two or more axes. For example, the diffusion screen may be configured to have first diffusing properties along a first axis and second diffusing properties along a second axis so that light is diffused by the diffusion screen at different angels along the first axis and second axis. For example, the diffusion screen may be configured to have diffusing properties along an x-axis and y-axis so that light is diffused by the diffusion screen at different angels along the x-axis and y-axis.

The diffusion screen may be moved so that light can be outputted form the diffusion screen at different angles.

The light diffusing means may be configured output light rays at two or more different angles. The light diffusing means may be configured to output light rays at two or more different angles wherein the two or more different angles depend on a required location of pixels on a display screen. This enables the size of a virtual image which is projected by the projection system, or the size of an eye box, to be increased.

The light diffusing means may be configured to transmit light with a different diffusing factor along two or more axis. Preferably, the light diffusing means is configured to transmit light with a different diffusing factor in the X-axis and Y-axis direction. This enables the size of the virtual image, or the size of an eye box, in one specific direction, to be increase.

The light diffusing means may comprise at least one diffusion screen comprising a plurality of regions wherein each of the plurality of regions is configured to transmit a different amount of light. For example, the diffusion screen may comprise a transmission coating, or a plurality of transmission coatings, which provide different light transmission properties at different regions of the diffusion screen. The diffuser screen may have optical transmission properties that compensate for the fact that the diffuser screen receives light which has non-uniform brightness, so that the light outputted from the diffuser screen has uniform brightness. For example, the diffusion screen preferably is configured to have a higher transmission at a centre region of the diffusion screen than at a border region of the diffusion screen. The diffusion screen is preferably configured to have a high light transmission in a centre region of the diffusion screen and lower light transmission on the border of the diffusion screen. The transmission properties of the light diffusing means (i.e. diffusion screen) can be achieved by applying various optical coatings or optical films which have various optical transmission properties, to a surface of the light diffusing means.

The light diffusing means may comprise at least one diffusion screen comprising a plurality of regions wherein each of the plurality of regions is configured to transmit light in a different direction.

The projection system may further comprise a vibrating means which cooperates with the light diffusing means to vibrate the light diffusing means, so as to reduce speckle pattern on a display screen.

The vibrating means may comprise a mechanical, thermal, piezoelectric or acoustic vibrating means.

The vibrating means may be configured such that it can vibrate the light diffusing means along a first axis with first amplitude of vibration and along a second axis with a second amplitude of vibration. The vibrating means may be configured such that it can vibrate the light diffusing means along three or more axes, wherein the amplitude of vibration along each of the three or more axes is different.

The light diffusing means may comprise polarisation cells which can polarise light which is received at the light diffusing means, so as to reduce speckle pattern on a display screen.

The laser source may comprise a MEMS mirror which can oscillate about an oscillation axis to scan laser light. Using a laser source which has a MEMS mirror to scan laser light provides increased brightness limitations, high contrast and high brightness dimming ratio.

The laser source may be configured to provide light which comprises light rays which are emitted at different emission diffusion angles. Thus, light rays received at light diffusing means will have different angles; this obviates the need for a diffusion screen with different optical properties along two or more axes e.g. along vertical (y) and horizontal (x) axis, to ensure that light is incident on the light diffusing means at different angles.

The projection system may further comprise one or more intermediate reflective surfaces placed along the optical path between the laser light source and the light diffusing means, so as to increase the length of the optical path. Increasing the length of the optical path will increase the size of the projected image.

The projection system may further comprise a display screen which is arranged to receive light which has been outputted from the light diffusing means, so that an image can be displayed on the display screen.

The projection system may further comprise a head-up display screen which is arranged to received light which has been outputted from the light diffusing means, so that an image can be displayed on the head-up display screen and fully or partially reflected by it. The head-up display screen may be a transparent or semi-transparent screen. The head-up display screen may have a planar profile. The head-up display screen may have a curved profile. Preferably the head-up display screen has a concave profile. Preferably the surface of the display screen on which an image is projected has a concave profile.

The projection system may be arranged to project an image onto a window of a vehicle. The window may be further configured reflect projected light towards a drive or the vehicle.

The laser source may comprise a MEMS mirror which can oscillate about an oscillation axis to scan laser light.

According to a further aspect of the present invention there is provided a projection system comprising, a laser source; a MEMS mirror which is arranged in optical communication with the laser source and wherein the MEMS mirror can oscillate about at least one axis to scan light from the laser source; a light diffusing means which is arranged to receive the light scanned by the MEMS mirror; wherein the projection system further comprises a vibrating means which is arranged to cooperate with the light diffusing means to vibrate the light diffusing means, so as to reduce speckle pattern.

According to a further aspect of the present invention there is provided a vehicle comprising a projection system according to any one of the above-mentioned projection systems.

According to a further aspect of the present invention there is provided a head-up display comprising a projection system according to any one of the above-mentioned projection systems.

According to a further aspect of the present invention there is provided a head-mounted display system comprising a projection system according to any one of the above-mentioned projection systems.

According to a further aspect of the present invention, there is provided a projection system comprising, a laser source which is configurable to project light; a light diffusing means which can diffuse light wherein the light diffusing means is arranged in optical communication with the laser source; wherein the light diffusing means has a two or more regions each of which are configured to have different optical transmission properties.

The light diffusing means may further comprises two or more regions each of which are configured to have different optical properties so that light output from different regions of the light diffusing means has different brightness.

The light diffusing means may be further configured to have different optical properties so that light output from the light diffusing means can provide different sized pixels on a display screen so that a projected image will have different sized pixels.

The laser source preferably comprises a MEMS mirror which can oscillate about an oscillation axis to scan laser light.

According to a further aspect of the present invention, there is provided a projection system comprising, a laser source which is configurable to project light; a light diffusing means which can diffuse light, wherein the light diffusing means is arranged in optical communication with the laser source; wherein the light diffusing means comprises two or more regions each of which are configured to have different optical properties so that light output from the light diffusing means can provide different sized pixels on a display screen so that a projected image will have different sized pixels. For example, the light diffusing means may comprise at least two regions which each have different optical properties, so that the pixels which define an outer region of the projected image are larger than the pixels which define a central region of the projected image.

The light diffusing means may further comprise two or more regions each of which are configured to have different optical transmission properties so that light output from different regions of the light diffusing means has different brightness.

The laser source preferably comprises a MEMS mirror which can oscillate about an oscillation axis to scan laser light.

According to a further aspect of the present invention, there is provided a projection system comprising laser source which is configured to provide laser light which comprises light rays which are emitted at different emission diffusion angles so that the laser light has a non-circular laser spot; a light diffusing means which can diffuse light, arranged in optical communication with the laser source; wherein the light diffusing means is configured to compensate for the light rays being emitted at different emission diffusion angles, so that a the light rays output from the light diffusion means have a circular laser spot.

The laser source preferably comprises a MEMS mirror which can oscillate about an oscillation axis to scan laser light.

According to a further aspect of the present invention there is provided a method of projecting an image comprising the steps of, projecting light from a laser source; receiving the light at a telecentric optical component; outputting light comprising parallel rays, from the telecentric optical component; diffusing the light comprising parallel rays to provide diffused parallel light rays; using the diffused parallel light rays to define pixels of an image.

The method may comprise the step of using the diffused parallel light rays to project a virtual image. A virtual image is an image which is visible within a predetermined field of view; the image is created and redirected in the viewer eye at a distance of the retina such that the image is perceived by the viewer to be at a predetermined distance The method may comprise the step of using the diffused parallel light rays to project an image on a display surface. The display surface may have a planar or curved profile. Preferably, the display surface will have a concave profile. The display surface may be a head-up display. The display surface is most preferably configured to reflect the light towards the eye of a viewer, and will also be configured to enable the viewer to see-through the display screen. The display screen may be curved. The display surface may be transparent or semi-transparent, and semi-reflective. The display surface may be defined by a display screen; the display screen may have any of the properties of the display surface previously mentioned.

The method may further comprise the step of vibrating the light diffusing means so as to reduce speckle pattern on a display screen.

The method may comprise the step of vibrating the light diffusing means with a first amplitude of vibration along a first axis and vibrating the light diffusing means with a second amplitude of vibration along a second axis. The method may comprise the step of vibrating the light diffusing means with a first amplitude of vibration along a first axis and vibrating the light diffusing means with a second amplitude of vibration along a second axis and vibrating the light diffusing means with a one or more other amplitudes of vibration along a one or more other axes. For example, the method may comprise the step of vibrating the light diffusing means with a third amplitude of vibration along a third axes. The first, second and third axes may be perpendicular to one another. The first, second and one or more other amplitudes of vibrations may be equal.

The method may comprise the step of polarising the light which is received at the light diffusing means so as to reduce speckle pattern on a display screen.

The method may further comprise the step of focusing the light rays before the light rays before the light rays are input to a light diffusing means. Preferably, the method further comprises the step of focusing the parallel light rays outputted from the telecentric optical component, before the parallel light rays are diffused. Preferably, the method further comprises the step of focusing the parallel light rays outputted from the telecentric optical component, onto a light diffusing means.

BRIEF DESCRIPTION OF THE DRAWINGS

The invention will be better understood with the aid of the description of embodiments, which are given by way of example only, and illustrated by the figures, in which:

FIG. 7b illustrates the movement of the diffusion screen in the embodiment presented in FIG. 7a; FIG. 7c provides a schematic diagram of another possible embodiment of the projection system shown in FIG. 7a;

FIG. 10 illustrates a diffusion screen which is configured to compensate for a non-circular laser spot provided by the laser source;

FIG. 11 provides a side view of projection system according to a further aspect of the present invention;

DETAILED DESCRIPTION OF POSSIBLE EMBODIMENTS OF THE INVENTION

Figure 1O:
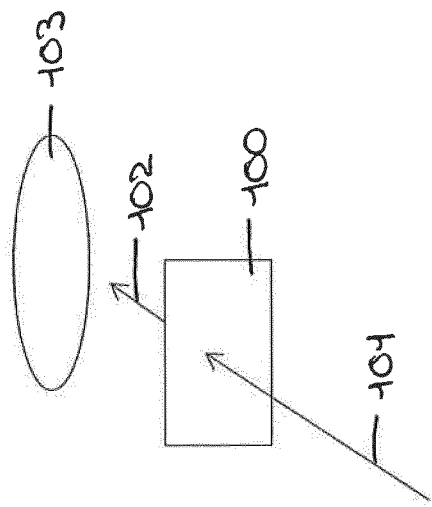
FIGS. 1a-c each provides a perspective view of a projection system according to the present invention.

FIGS. 1a-c each provides a perspective view of a projection system 10 according to the present invention. The projection system 10 comprises a laser source 1 which is configurable to project laser light. It will be understood that the laser source may take any suitable form; for example the laser source may comprise one or multiple lasers and one or multiple MEMS (Micro-Electro-Mechanical System) mirror set in optical communication with the laser and which can oscillate about one or two oscillation axes to scan light from the laser.

The projection system 10 also comprises a light diffusing means in the form of a diffusion screen 3, which can diffuse light. The laser source 1 and the light diffusing means 3 are arranged to be in optical communication along an optical path (indicated by arrow 7).

The projection system 10 further comprises a telecentric optical component 2. The telecentric optical component may comprise glass or polymer. The telecentric optical component 2 is disposed along said optical path 7 between the laser source 1 and the diffusion screen 3, so that the a telecentric optical component 2 receives light projected from the laser source 1 and can output light comprising parallel light rays to the diffusion screen 3. The telecentric optical component 2 may comprise a surface coating (not shown) which is configured to reduced parasitic reflection.

Two intermediate reflective surfaces, in the form of mirrors 4, are positioned along the optical path 7 between the laser source 1 and the diffusion screen 3, so as to increase the length of the optical path 7 and therefore increase the image size at a surface of the telecentric optical component 2, and ultimately increase the size of the projected image.

As shown in FIG. 1b the projection system 10 further comprises a video input port 6 and circuitry 5. The circuitry 5 can be used to drive a MEMS mirror (not shown) located within the laser source 1 so that the MEMS mirror oscillates to scan light. The video input port 6 and circuitry 5 enable the projection system 10 to be connected to a computer or another video source (not shown) so that the projection system 10 may be used to project a video stored on the computer or video source. The circuitry 5 is also used to control the light intensity of the laser source 1; to control colour gamut of the projection system 10; and to synchronize the oscillating MEMS mirror position with a laser modulation of the laser source 1. The video input port 6 is also used to stream input video.

During use of the projection system 10, light is generated at the laser source 1 and is transmitted, via the mirror 4, to the telecentric optical component 2. The telecentric optical component 2 will output the light as parallel light rays which are incident on the diffusion screen 3. The diffusion screen 3 diffuses the parallel light rays, to provide diffused parallel light rays; these diffused parallel light rays are used to project either a virtual image or an image on a display surface such as a head-up display surface.

The telecentric optical component 2 will ensure that light incident on the diffusion screen 3 will comprise parallel light rays; accordingly, the light rays will each be incident on the diffusion screen 3 at the same angle of incidence. As each light ray will be incident on the diffusion screen 3 at the same angle, the angle of diffusion of the diffused light outputted from diffusion screen 3 will be independent of the angle of incidence of the light rays on the diffusion screen 3. Accordingly, the angle of diffusion of the diffused light outputted from diffusion screen 3 can be accurately controlled by adjusting the properties and position of the diffusion screen 3 appropriately.

Figure 1O:
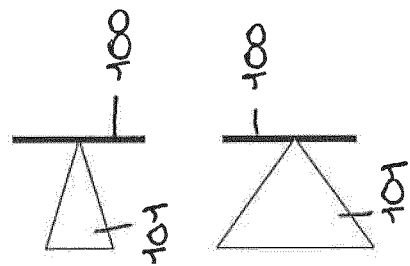

The projection system 10 shown in FIG. 1 can be used to implement a method according to the present invention which comprises the steps of, projecting light from the laser source 1; receiving the light at the telecentric optical component 2; outputting light comprising parallel rays, from the telecentric optical component 2; diffusing the light comprising parallel rays to provide diffused parallel light rays; and using the diffused parallel light rays to define pixels of an image. The diffused parallel light rays may be used to project a virtual image. A virtual image is an image which is visible within a predetermined field of view. Alternatively, or additionally, the diffused parallel light rays may be used to project an image on a display surface such as a head-up display. The display surface may have a planar or curved profile. Preferably, the display surface will have a concave profile and is semi-reflective surface with see-through capabilities.

Figure 2:
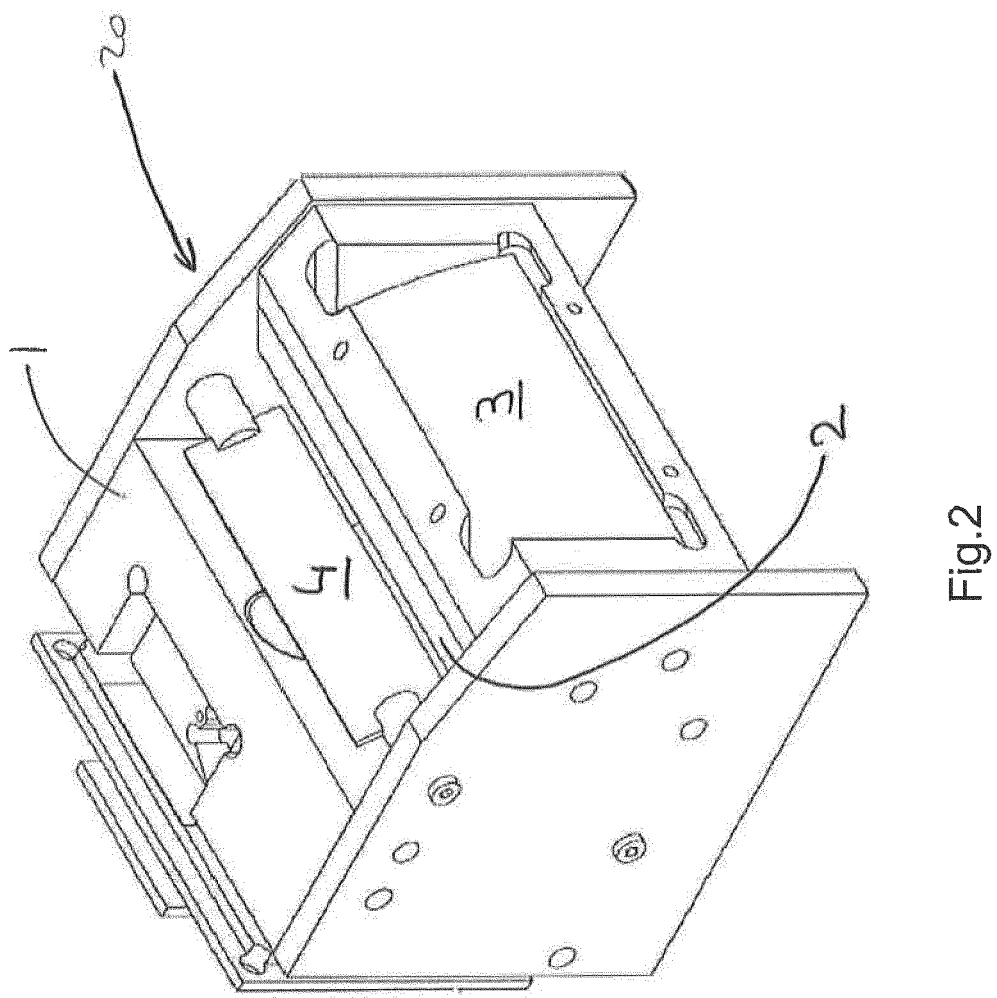
FIG. 2 provides a perspective view of a projection system according to the present invention.

FIG. 2 provides a perspective view of a projection system 20 according to a further embodiment of the present invention. The projection system 20 has the same features as the projection system 10 shown in FIG. 1, and like features are awarded the same reference numerals. The projection system 20 differs from the projection system 10 shown in FIG. 1 only in that the laser 1, telecentric optical component 2, diffusion screen 3 and intermediate mirrors 4 are arranged at a different position relative to one another; otherwise, the technical features and operation of the projection system 20 is identical to the projection system 10 shown in FIG. 1.

FIGS. 3-8 each illustrate example embodiments of the projection systems 10, 20 illustrated in FIGS. 1 and 2 respectively. Each of the embodiments illustrated in FIGS. 3-8 have many of the same features as the embodiments illustrated in FIGS. 1 and 2, and like features are awarded the same reference numerals. For simplicity, the mirrors 4 and circuit 5, 6 have been omitted from FIGS. 3-8.

Figure 3:
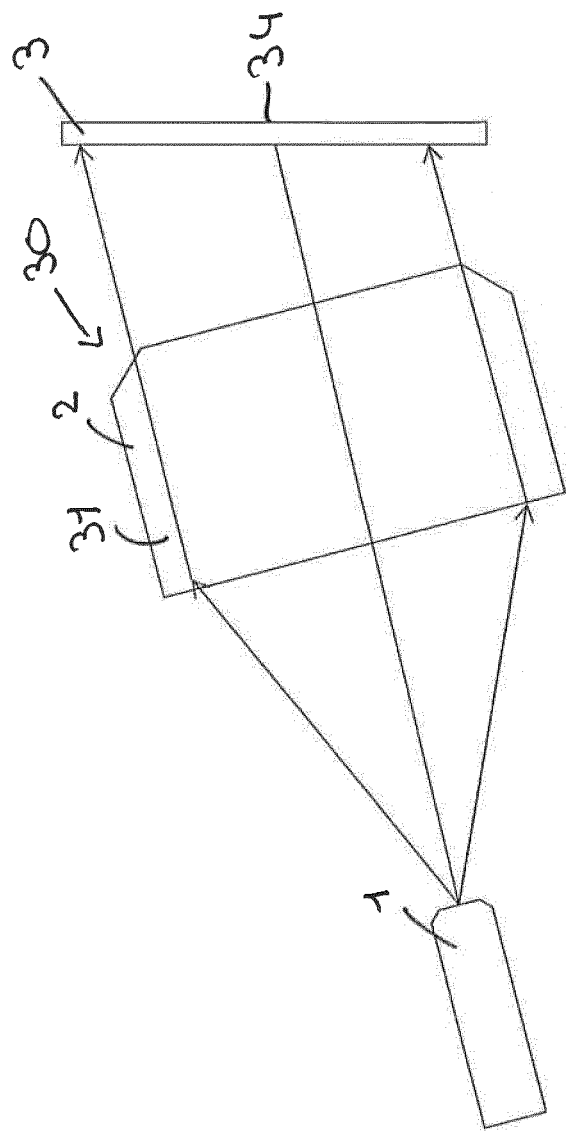
FIG. 3 provides a schematic diagram of one possible embodiment of the projection system shown in FIGS. 1 and 2.

FIG. 3 provides a schematic diagram of one possible embodiment of the projection systems 10, 20 shown in FIGS. 1 and 2. In the projection system 30 illustrated in FIG. 3 a single telecentric lens 31 defines the telecentric optical component 2. Using a single telecentric lens 31 to define the telecentric optical component 2 minimises the number of components in the projection system 30.

Figure 4:
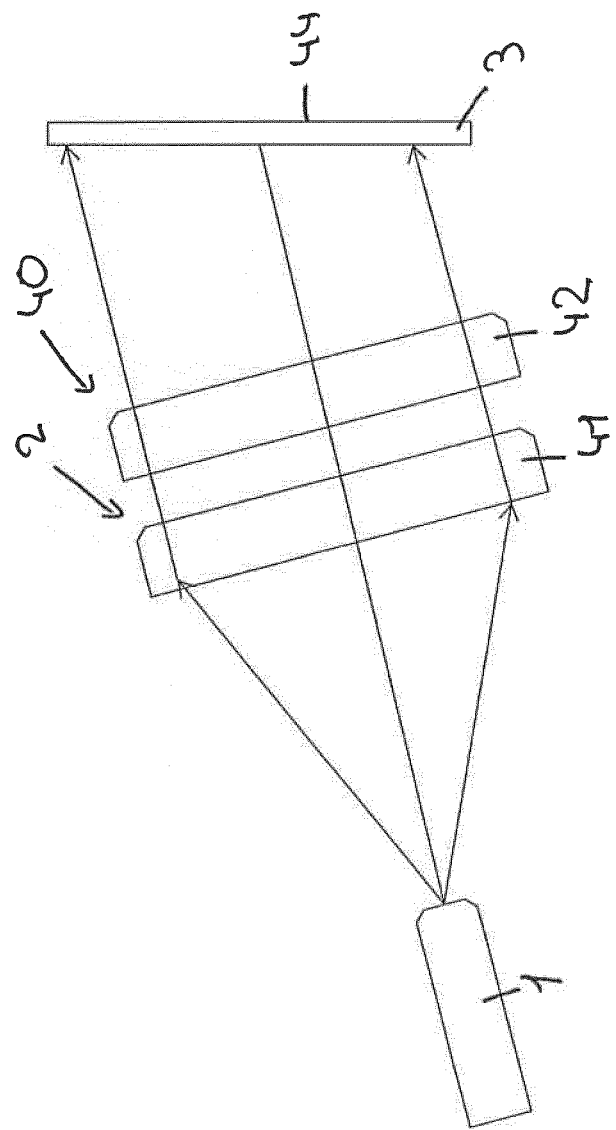
FIG. 4 provides a schematic diagram of another possible embodiment of the projection system shown in FIGS. 1 and 2.

FIG. 4 provides a schematic diagram of another possible embodiment of the projection system shown in FIGS. 1 and 2. In the projection system 40 illustrated in FIG. 4, the telecentric optical component 2 is defined by a first telecentric lens 41 which is configured to "parallelize" the rays on an x (horizontal) axis, and a second telecentric lens 42 is configured to "parallelize" the rays on a y (vertical) axis. Using two individual lenses, each for a different axis of light rays, to define the telecentric component 2, is cheaper than using a single telecentric lens 31 which is configured to provide parallel light rays for both axis of a light ray.

Figure 5:
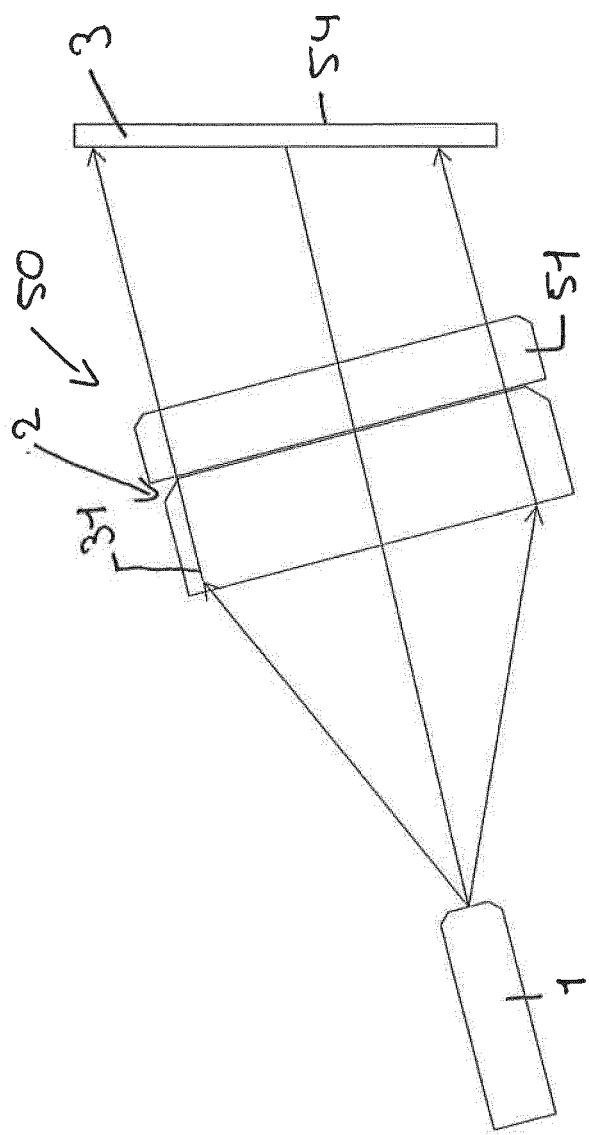
FIG. 5 provides a schematic diagram of another possible embodiment of the projection system shown in FIGS. 1 and 2.

FIG. 5 provides a schematic diagram of another possible embodiment of the projection system shown in FIGS. 1 and 2. In the projection system 50 illustrated in FIG. 5 the telecentric optical component 2 comprises a telecentric lens 31 which is configured to provide parallel light rays and an achromatic lens 51. The achromatic lens 51 will ensure that no achromatic aberration is generated.

Figure 6:
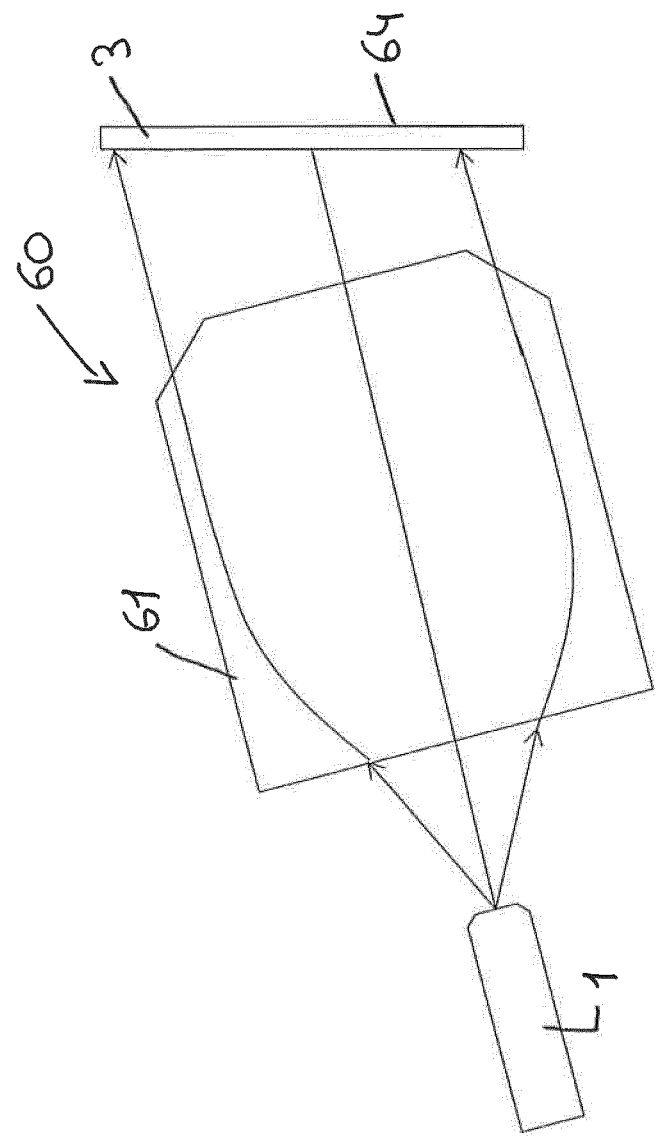
FIG. 6 provides a schematic diagram of another possible embodiment of the projection system shown in FIGS. 1 and 2.

FIG. 6 provides a schematic diagram of another possible embodiment of the projection system shown in FIGS. 1 and 2. In the projection system 60 illustrated in FIG. 6 the telecentric optical component 2 comprises a GRIN lens 61. The advantages associated with the use of GRIN lens 61 have already been outlined.

Figure 7A:
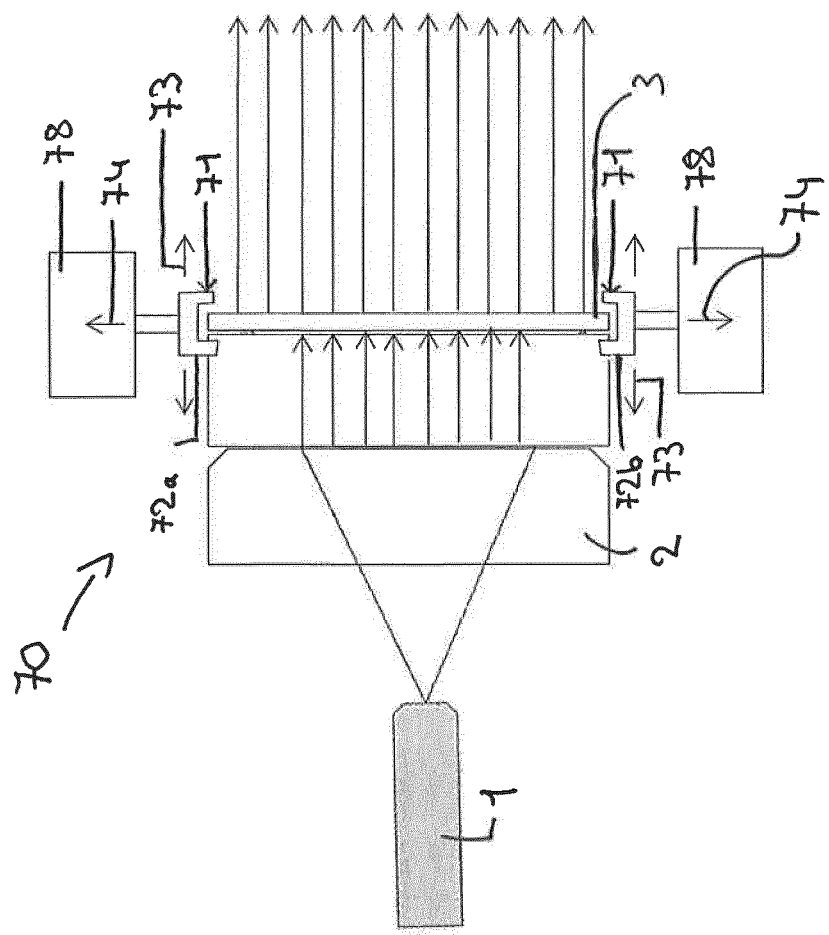
FIG. 7a provides a schematic diagram of another possible embodiment of the projection system shown in FIGS. 1 and 2.

FIG. 7*a* provides a schematic diagram of another possible embodiment of the projection system shown in FIGS. 1 and 2. The projection system 70 shown in FIG. 7*a* comprises a vibrating means 71 which is arranged to cooperate with the diffusion screen 3 so that the vibrating means 71 can vibrate the diffusion screen 3. Vibrating the diffusion screen 3 will reduce speckle pattern produced by light outputted from the diffusion screen 3 when the light outputted from the diffusion screen 3 is projected onto a display screen.

The vibrating means 71 may take any suitable form. For example, the vibrating means 71 may be a mechanical vibrating means which mechanically moves the diffusion screen 3. The vibrating means 71 shown in FIG. 7*a* is a mechanical vibrating means 71 which comprises a pair of arms 72*a*,72*b* which cooperate with the diffusion screen 3 to hold the diffusion screen 3; the arms 72*a*,72*b* cooperate with an electrical drive system 78 which can operate to reciprocally move the pair of arms 72*a*,72*b* so that they vibrate the diffusion screen 3. Alternatively, the vibrating means 71 may be an acoustic vibrating means. The acoustic vibrating means may generate acoustic waves which are received by the diffusion screen 3; the diffusion screen 3 will vibrate upon receipt of these acoustic waves. Alternatively, the vibrating means 71 may be thermal vibrating means. The thermal vibrating means may deform the screen and then vibrate it by mean of thermal expansion of material.

The vibrating means 71 illustrated in FIG. 7*a* is configured to vibrate the diffusion screen 3 along a first axis 73 with first amplitude of vibration and along a second axis 74 with a second amplitude of vibration. To achieve this the pair of arms 72*a*,72*b* are reciprocally moved by the electrical drive system 78, along a first axis 73 with a first amplitude of movement and are moved along the second axis 74 with a second amplitude of movement. FIG. 7*b* illustrates the movement of the diffusion screen 3 in the embodiment shown in FIG. 7*a*. It will be understood that the vibrating means 71 is not limited to vibrating the diffusion screen 3 along two axes 73,74 the vibrating means 71 may be configured such that it can vibrate the diffusion screen 3 along any number of axes with any amplitude of vibration; for example the vibrating means 71 may be configured such that it can vibrate the diffusion screen 3 along three or more axis (for example the vibrating means 71 may be configured such that it can vibrate the diffusion screen 3 along an x, y and/or z axis) wherein the amplitudes of vibration along each of the three or more axis is different. Alternatively the amplitudes of vibration along each axis may be equal. It will also be understood that the vibrating means 71 is not limited to the pair of arms 72*a*,72*b* and electrical drive system 78; the vibrating means 71 may take any suitable form, for example the vibrating means may be achieved using a vibrating body.

The vibrating means 71 may be used when carrying out a method according to the present invention, to implement the step of vibrating the diffusion screen 3 so as to reduce speckle pattern produced by the diffused light. It may be used to implement the step of vibrating the diffusion screen 3 with a first amplitude of vibration along a first axis and vibrating the diffusion screen 3 with a second amplitude of vibration along a second axis.

Figure 7C:
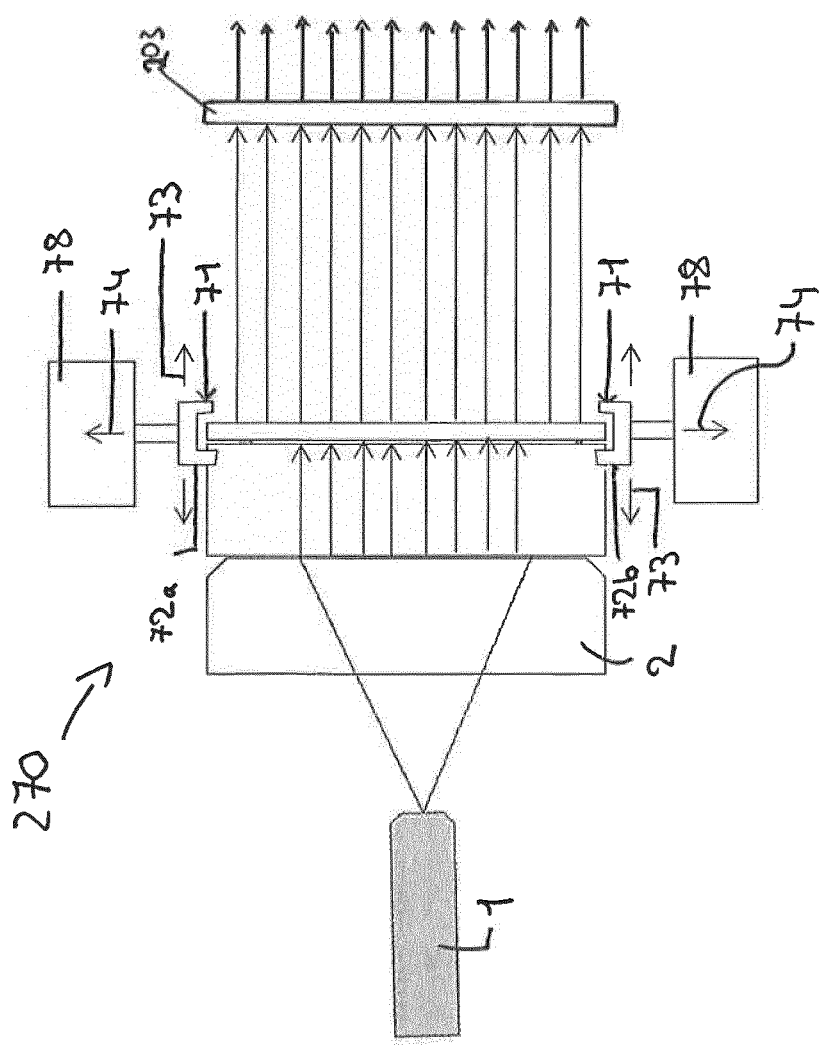

FIG. 7*c* provides a schematic diagram of another possible embodiment of the projection system shown in FIG. 7*a*. The projection system 270 shown in FIG. 7*c* has many of the same features as the projection system 70 shown in FIG. 7*a* and like features are awarded the same reference numbers.

The projection system 270 further comprises a second diffusion screen 203. In this particular example the second diffusion screen 203 is fixed, while the first diffusion screen can be vibrated by the vibrating means 71 as described above for FIG. 7*a*. Alternatively, the second diffusion screen 203 may be movable and a second vibrating means (not shown) may be provided to vibrate the second diffusion screen 203. The first and second diffusion screens 3, 203 may each be movable in any random direction; preferably the first and second diffusion screens 3, 203 will be moved in opposite directions to one to the other; for example, while the first diffusion screen 3 is moved downwardly in the direction along arrow 74, the second diffusion screen 203 is moved upwardly in the direction along arrow 74, and vice versa. Preferably, the first and second diffusion screens 3, 203 are positioned as close together as possible, without touching; this ensures that the projected image will have improved quality. Most preferably, the distance between the first and second diffusion screens 3, 203 is between 0 to 1000 microns The first and/or second diffusion screens 3, 203 may comprise re-emissive material (material such as nano-particle or phosphor that absorbs light in a specific peak wavelength and re-emits light in all directions at a different peak wavelength with larger spectral width and reduced coherence length); the advantage being that because the light is re-emitted at a different wavelength with larger spectral width and reduced coherent length, there is a reduced speckle effect because the light is less coherent. The amount of re-emissive material provided in the first and/or second diffusion screens 3, 203 can be modulated depending on the amount of speckle reduction that is required. In the embodiments described above the first and/or second diffusion screens 3, 203 will typically comprise a diffuser film (a diffuser film receives a light beam and emits the light beam with a predetermined angle and a given transmission efficiency); alternatively the first and/or second diffusion screens 3, 203 may be composed only of re-emissive material, so that a diffuser film is no longer required; in this case advantageously, a vibrating means is no longer required as the re-emissive material alone will remove speckle.

Figure 8:
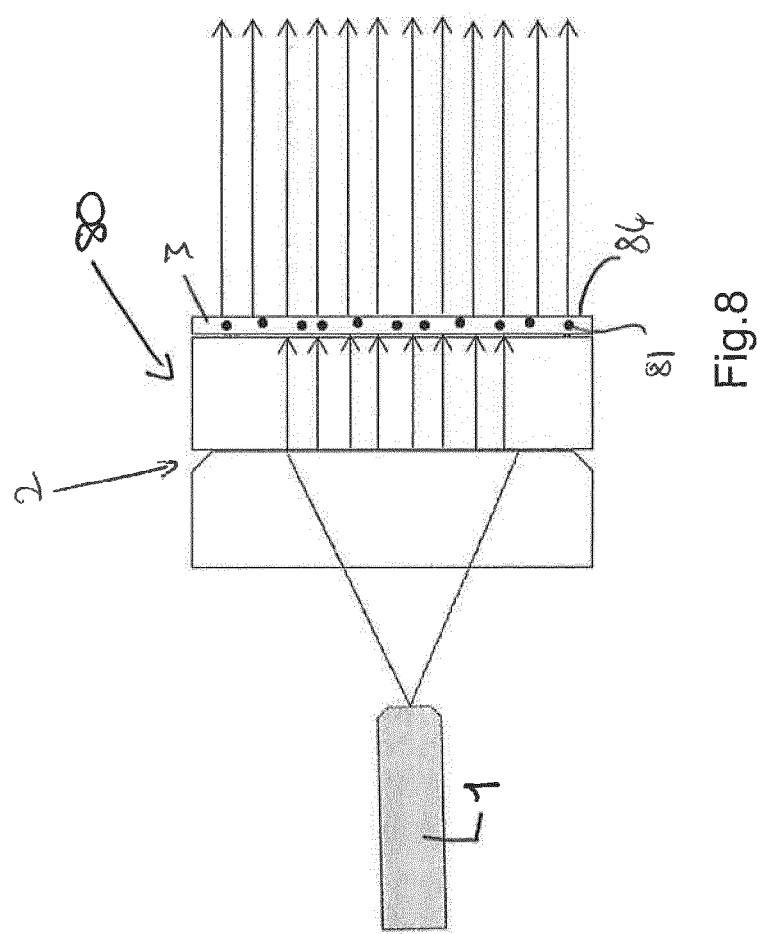
FIG. 8 provides a schematic diagram of another possible embodiment of the projection system shown in FIGS. 1 and 2.

FIG. 8 provides a schematic diagram of another possible embodiment of the projection system shown in FIGS. 1 and 2. In the projection system 80 illustrated in FIG. 8 the diffusion screen 3 further comprises polarisation cells 81. The polarisation cells 81 can polarise light which is received at the diffusion screen 3, so as to reduce speckle pattern produced by light outputted from the diffusion screen 3 when the light outputted from the diffusion screen 3 is projected onto a display screen.

In each of the embodiments shown in FIGS. 1-8 the laser source may be configured to provide light which comprises light rays which are emitted at different emission diffusion angles.

In each of the embodiments illustrated in FIGS. 1-8, the diffusion screen 3 may be arranged to diffuse the parallel light rays output from the telecentric optical component 2. The diffusion screen 3 will diffuse the parallel light rays to provide diffused parallel light rays which may be used to project an image. The diffusion screen 3 may be arranged such that the diffused parallel light rays are projected onto a display screen such as a head-up display screen to display an image on the display screen, or may be used to project a virtual image.

In each of the embodiments illustrated in FIGS. 1-8, the diffusion screen 3 may be configured so that the diffused parallel light rays outputted from the diffusion screen 3 is outputted in a direction which is perpendicular to a surface of the diffusion screen 3. The diffusion screen 3 may comprise a patterned surface so that all diffused parallel light rays outputted from the diffusion screen 3 are outputted in a direction which is perpendicular to a surface (34,44,54,64,79,84) of the diffusion screen 3. The diffusion screen 3 may comprise a repeating pattern on a surface of the diffusion screen 3. Preferably, the diffusion screen 3 comprises a specific pattern wherein the pattern is dependent on the angle of incidence of light which is to be received by the diffusion screen 3, so that light rays are outputted from the diffusion screen 3 perpendicular to a surface of the diffusion screen 3. The diffusion screen 3 can be provided with a patterned surface by applying a patterned film to a surface of the diffusion screen 3. The film, or the surface of the diffusion screen 3, can be provided with a pattern using any suitable means, for example using; hot embossing, with a mould so-called master (for example embossing an epoxy with a nickel master mould and then with or without curing with UV light); using sol-gel technique; or Injection moulding.

In each of the embodiments illustrated in FIGS. 1-8, the diffusion screen 3 may comprise a plurality of regions wherein each of the plurality of regions is configured to diffuse light at a different angle.

In each of the embodiments illustrated in FIGS. 1-8, the diffusion screen 3 may comprise a plurality of regions wherein each of the plurality of regions is configured to transmit a different amount of light. This can be achieved by applying one or more coatings or films, to the diffusion screen 3, whereby the coatings or films are configured to each have a different optical transmission; or whereby the optical transmission of a coating or film is different in different regions of the coating or film. Preferably the diffusion screen 3 will be configured to have higher optical transmission in a centre region of the diffusion screen 3 and lower optical transmission on the border regions of the diffusion screen 3.

In each of the embodiments illustrated in FIGS. 1-8, the diffusion screen 3 may comprise a plurality of regions wherein each of the plurality of regions is configured to transmit light in a different direction.

Figure 9:
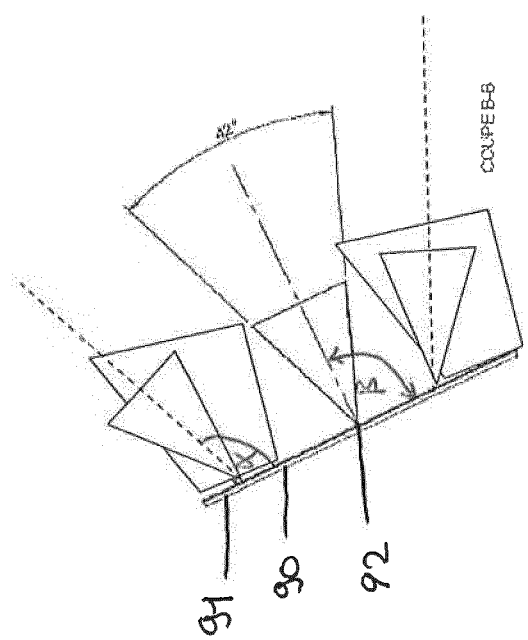
FIG. 9 illustrates a diffusion screen which has different output diffusing angles at different positions on the diffusion screen.

FIG. 9 illustrates a diffusion screen 90 which is configured to output light, at different positions 91,92 of the diffusion screen 90, at different output diffusing angles α,β.

FIGS. 10a,b illustrates a diffusion screen 100 wherein input light 101 provided by a laser source (not shown), is incident on a diffusion screen 100 with two different angles along the vertical and horizontal directions, as shown in FIG. 10a. Accordingly, the light outputted 102 form the diffusion screen 100 has a non-circular laser spot 103, as shown in FIG. 10b. The diffusion screen 100 may be configured to compensate the input light 101 provided by the laser source so that the light outputted 102 form the diffusion screen 100 has a circular laser spot. The diffusion screen 100 may be configured to compensate the input light by means of patterns which may be provided on a surface of the diffusion screen 100, wherein the patterns have optical properties which compensate the input light 101 so that the light outputted 102 has a circular laser spot.

FIG. 11 provides a side view of projection system 110 according to a further aspect of the present invention. The projection system 110 comprises, a laser source 111 which is configurable to project light 112; and a light diffusing means in the form of a diffusion screen 113 which can diffuse light. The diffusion screen 113 has a two regions 117a,b, which are configured to have different optical transmission properties so that light output 114 from the light diffusing means 113 can provide different sized pixels 115 on a display screen 116, so that different regions of a projected image 118 will have different sized pixels. In this case the pixels 115 defining an outer region of the projected image 118 are larger than the pixels defining a central region of the projected image 118.

In this example the two regions 117a,b are also each configured to have different optical transmission properties so that light output from different regions of the diffusion screen 113 has different brightness. In the case light output from a second region 117b is brighter than the light output from the first region 117a of the diffusion screen 113. This will compensate for non-uniform brightness light transmitted to the diffusion screen 113 by the laser source 111. In this example the projection system 110 also includes a telecentric optical component 118 disposed between the diffusion screen 113 and laser source 111; however in this example the telecentric optical component 118 is optional.

Figure 12:
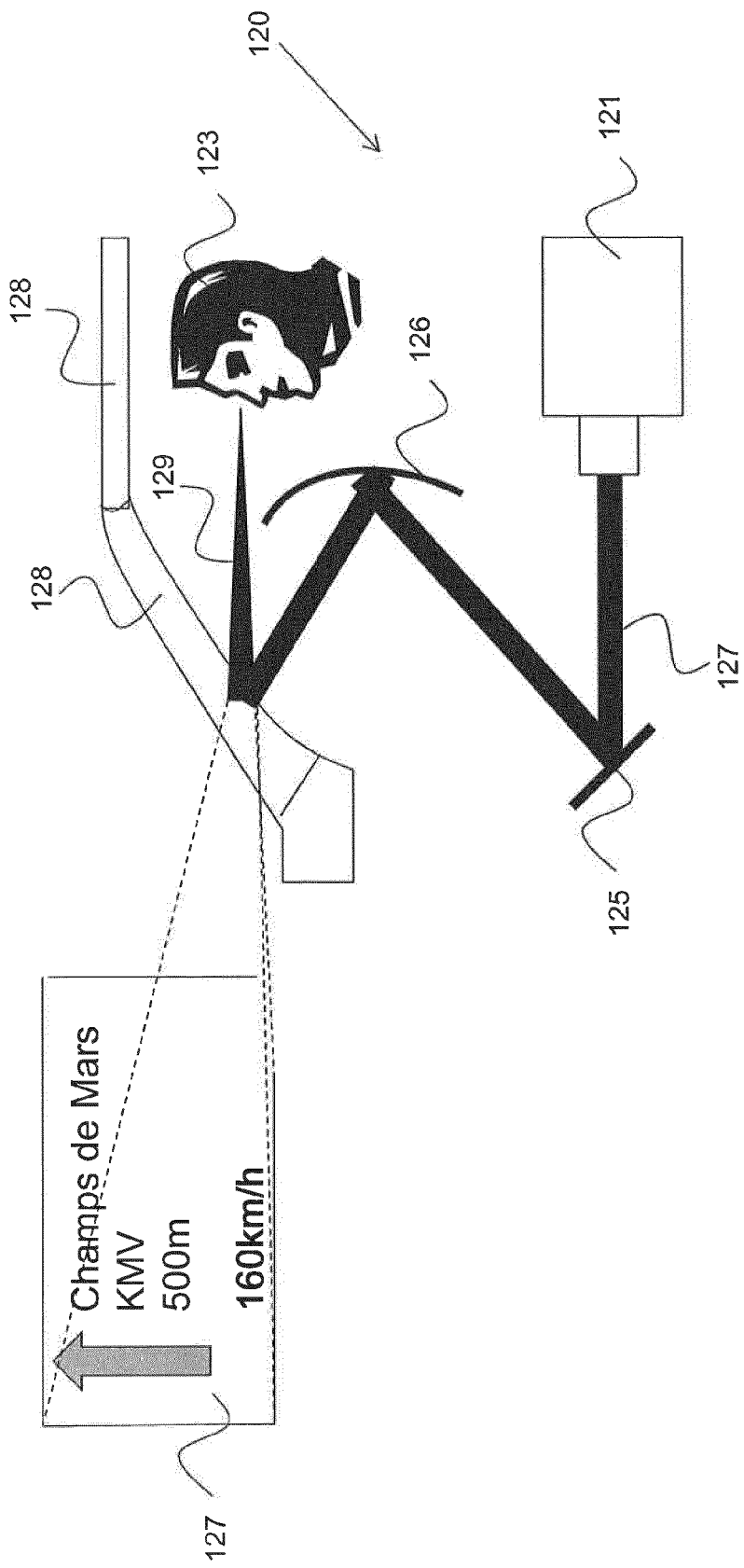
FIG. 12 provides a schematic diagram of a head-up system which comprises a projection system according to the present invention.

FIG. 12 provides a schematic diagram of a head-up system 120 which comprises a projection system 121 which has the feature of any one of the afore-mentioned projection system embodiments. The head-up system 120 further comprises an intermediate reflective planar mirror 125 and an intermediate reflective curved mirror 126. Light 127 projected from the projection system 121 is directed via the intermediate reflective planar mirror 125 to the intermediate reflective curved mirror 126, wherein it is directed to a windscreen 124 of a vehicle 128; the light 127 is direct to a point on the windscreen 124 which is within a field of view 129 of a user 123. Importantly, in this example, the projection system 121 is configured to project a virtual image 122, which appears outside of the windscreen 124 and within the users 123 field of view 129. Light is projected onto the windshield, but the windshield has a specific reflective surface at this projection zone; therefore the image is reflected to the users 123 eyes. The virtual image 127 depicts information such as the speed the vehicle 128 is moving, and also navigation information. The virtual image 122 is viewable within a predefined viewing window (not shown); if the user 123 looks outside the predefined viewing window the virtual image 122 will no longer be visible to the user 123. Optionally, the windscreen 124 may be configured so that it can act as an optical element; for example the windscreen 124 may be configured to modify the optical properties of the light 127 e.g. focus the light, or direct light toward the retina of a viewer, so as to enable the projection of an image. Also, it will be understood that, instead of projecting a virtual image 122 the projection system 121 may alternatively project an image (real image) onto the windscreen 124.

Figure 13:
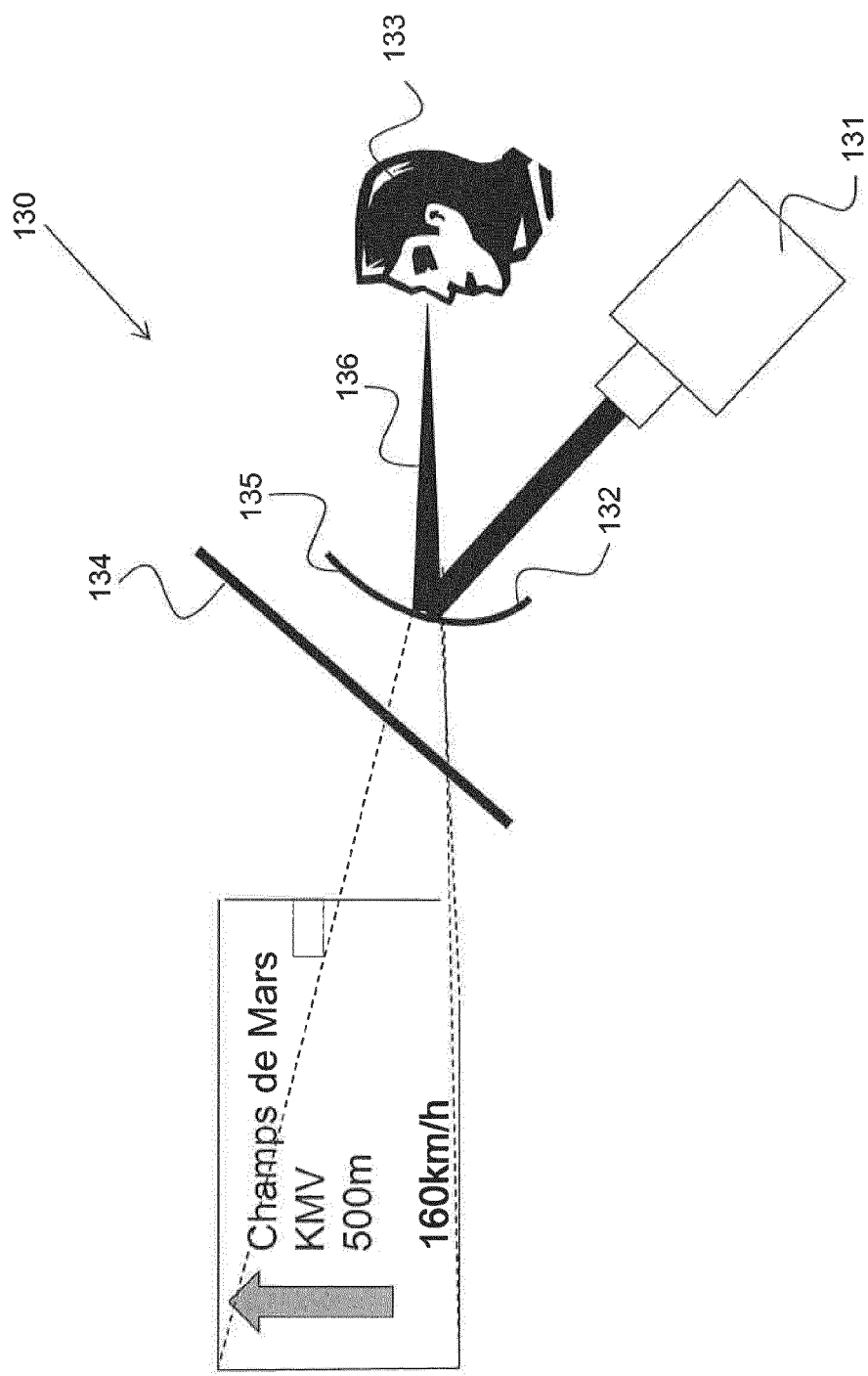
FIG. 13 provides a schematic diagram of a head-up system which comprises a projection system according to the present invention.

FIG. 13 provides a schematic diagram of a further head-up system 130 which comprises a projection system 131 which has the features of any one of the afore-mentioned embodiments. Unlike the head-up system 120 shown in FIG. 12, the head-up system 130 is configured to project an image on a display surface. The projection system 131 comprises a display screen in the form of a head-up display screen 132, which is arranged to received light which has been outputted from the projection system 131, so that an image can be displayed on a surface 135 of the head-up display screen 132. The head-up display screen 132 is a semi-transparent, reflective screen which is arranged to be in a user 133 typical field of view 136. In this example the head-up display screen 132 has a curved profile with a surface 135 on which an image is displayed having a concave profile. It will be understood that the head-up display screen 132 may have any other suitable profile, for example the head-up display screen 132 may have a planar profile.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A projection system comprising,
   a laser source which is configurable to project light;
   a light diffusing means which can diffuse light; wherein the laser source and the light diffusing means are arranged to be in optical communication along an optical path;
   wherein the projection system further comprises a telecentric optical component which is disposed along said optical path between the laser source and the light diffusing means, so that the a telecentric optical component receives light projected from the laser source and outputs parallel light rays to the diffusing means and wherein the projection system further comprises a head-up display screen which comprises a curved mirror or a curved semi-transparent semi-reflective component which is arranged to receive light which has been outputted from the light diffusing means, so that a virtual image is displayed.

2. The projection system according to claim 1 wherein the telecentric optical component comprises a first telecentric lens which is configured to make the light rays on a first axis parallel and a second telecentric lens which is configured to make the light rays on a second axis parallel.

3. The projection system according to claim 1, wherein the telecentric optical component comprises an achromatic lens so that no achromatic aberration is generated.

4. The projection system according to claim 1, wherein the telecentric optical component comprises a GRIN lens.

5. The projection system according to claim 1, wherein the light diffusing means is configured to output the parallel light rays in a direction which is perpendicular to a surface of the light diffusion means.

6. The projection system according to claim 1, wherein the light diffusing means comprises diffusion screen comprising a plurality of regions wherein each of the plurality of regions is configured to diffuse light at a different angle.

7. The projection system according to claim 1, wherein the light diffusing means comprises diffusion screen comprising a plurality of regions wherein each of the plurality of regions is configured to transmit a different amount of light.

8. The projection system according to claim 1, wherein the light diffusing means comprises a diffusion screen comprising a plurality of regions wherein each of the plurality of regions is configured to direct light in a different direction.

9. The projection system according to claim 1, further comprising a vibrating means which cooperates with the light diffusing means to vibrate the light diffusing means so as to reduce speckle pattern produced by light outputted from projection system.

10. The projection system according to claim 1, wherein the projection system is arranged to project an image onto a window of a vehicle.

11. A method of projecting an image comprising the steps of,
    projecting light from a laser source;
    receiving the projected light at a telecentric optical component;
    outputting parallel light rays, from the telecentric optical component;
    diffusing the parallel light rays to provide diffused parallel light rays;
    passing the diffused parallel light rays to a head-up display screen which comprises a curved mirror or a curved semi-transparent semi-reflective component; and
    using the diffused parallel light rays to define pixels of a virtual image.

12. The method according to claim 11, further comprising the step of vibrating the light diffusing means so as to reduce speckle pattern produced by the diffused parallel light rays.

13. The method according to claim 11, further comprising the step of focusing the outputting parallel light rays on a light diffusing means.

* * * * *